United States Patent [19]
Hedland

[11] 3,805,611
[45] Apr. 23, 1974

[54] FLUID FLOW METER
[75] Inventor: Harry A. Hedland, Racine, Wis.
[73] Assignee: Racine Federated, Inc., Racine, Wis.
[22] Filed: Dec. 11, 1972
[21] Appl. No.: 313,784

[52] U.S. Cl. .................................. 73/209, 73/209
[51] Int. Cl. ................................................ G01f 1/00
[58] Field of Search ..................................... 73/209

[56] References Cited
UNITED STATES PATENTS

| | | | |
|---|---|---|---|
| 2,325,884 | 8/1943 | Schorn | 73/209 |
| 3,398,305 | 8/1968 | Brewer | 73/209 |
| 2,370,634 | 3/1945 | Brewer | 73/209 |
| 2,655,041 | 10/1953 | Jacobsson | 73/209 |
| 2,439,614 | 4/1948 | Schramm | 73/209 |
| 2,311,181 | 2/1943 | Bowen | 73/209 |

Primary Examiner—S. Clement Swisher
Assistant Examiner—John P. Beauchamp
Attorney, Agent, or Firm—Arthur J. Hansmann

[57] ABSTRACT

A fluid flow meter including a body piece having a chamber, and a piston slidably disposed within the chamber and having an opening therein for the flow of fluid therethrough. A spring urges the piston in one direction, and fluid pressure urges the piston in the opposite direction. A conically shaped piece is disposed axially of the piston and in the opening therein so that the axial position of the piston is in accordance with the rate of fluid flow through the opening. A magnet is on the piston, and the body piece is of a non-magnetic material, and a follower is on the exterior of the body piece and is attracted by the magnet to move with the displacement of the piston. A transparent guard is disposed over the indicator follower, and a scale is on the guard to show the position of the indicator and thus show the rate of flow through the meter. The conical piece has a threaded connection between it and the body for adjustably positioning the conical piece and thus setting the zero position, and the conical piece is slidably piloted in the body. Also, the transparent guard is cylindrically shaped and can be rotated to various positions for presenting the scale to different sides of the meter and thus permit reading from any selected side.

9 Claims, 6 Drawing Figures

PATENTED APR 23 1974    3,805,611
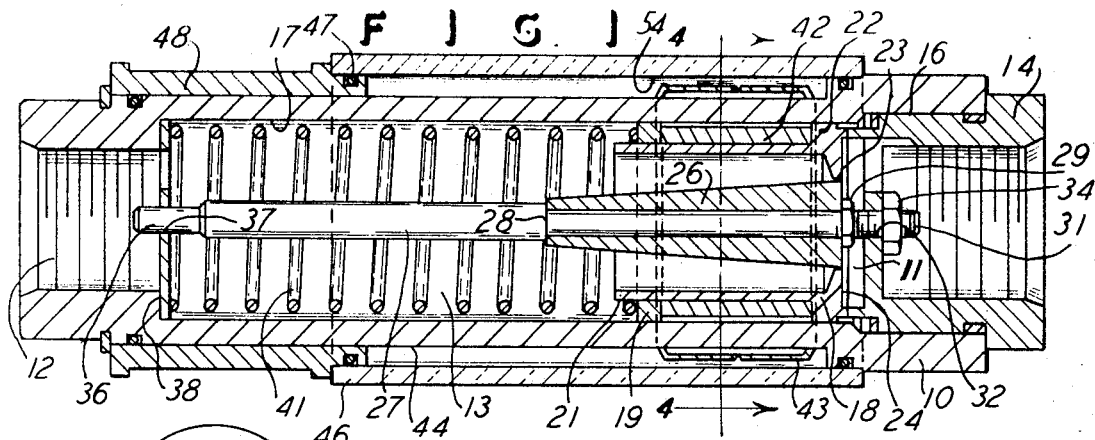
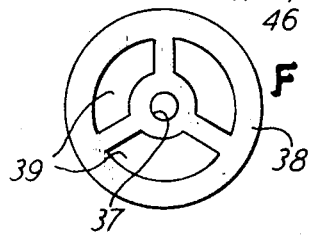
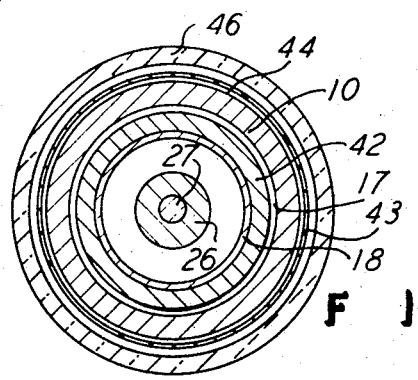
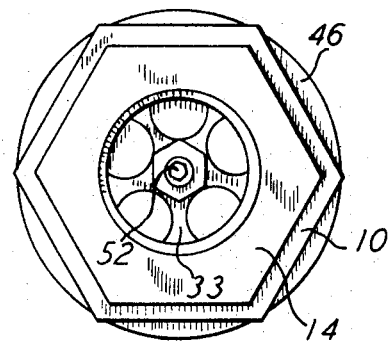
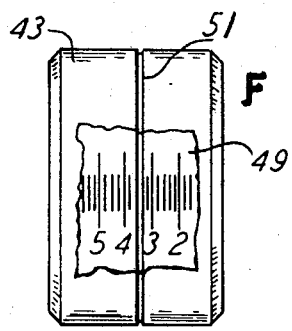
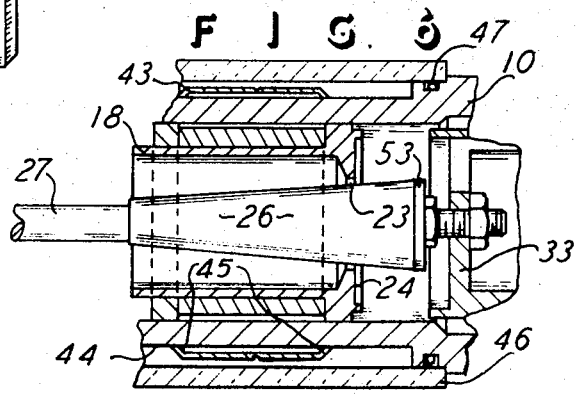

FLUID FLOW METER

This invention relates to a fluid flow meter, and, more particularly, it relates to a meter for detecting the rate of flow of a fluid passing through the meter which may be positioned in a line through which the fluid is flowing.

BACKGROUND OF THE INVENTION

Fluid flow meters already exist in different configurations and constructions, and they are of a nature to permit them to be installed in a fluid line for detecting the rate of flow of fluid through the line. Such meters or devices are shown in U. S. Pat. Nos. 3,218,853 and 3,554,031, and other structures for fluid flow devices may be like that shown in U. S. Pat. No. 2,638,582. Therefore, fluid flow meters are already known, and they include slidable piston members which have fluid openings extending over tapered or conical pieces so that the axial position of the piston is in accordance with the rate of fluid flow, somewhat as in the present invention. Also, as shown in U. S. Pat. No. 2,638,582, fluid flow devices utilize magnetic followers which indicate the condition of flow of the fluid through the device and the present invention also utilizes a magnetic follower.

However, the prior art devices do not concern themselves with nor are they directed at a structure which clearly and accurately indicates the rate of flow of fluid through the meter or device by utilization of a simplified but accurate and highly responsive meter as provided by the present invention. In contrast to prior art devices, the present meter provides a fluid-tight structure which does not impede the flow of fluid in the line but which readily and accurately discloses the rate of flow through the meter. In accomplishing this object, the meter of the present invention utilizes a magnetic follower which is on the exterior of the fluid-tight portion of the meter, and the follower is arranged with an indicator mark which extends completely around the meter and which can be observed and read from any side of the meter. Additionally, the meter of the present invention provides for a transparent dust guard which encloses the magnetic indicator or follower and which therefore retains the moving follower in a dust-free and clean condition so that the meter can remain accurate and is not exposed to contamination or to physical damage. Additionally, a scale is provided on the dust guard at a location immediately adjacent the indicator itself so that the most accurate reading of the rate of flow can be obtained, and this arrangement provides for a minimum of parallax in the reading being taken.

Still further, the meter of this invention provides a means for adjusting the position of the parts which indicate the rate of flow through the meter, and such adjustment permits allowance for manufacturing tolerances and for consequent wear or variation in the function of the few moving parts. That is, with the adjustment feature of the meter of this invention, means are provided to permit accurate matching of the indicator position to the markings on the read-out scale showing the rate of flow through the meter. As such, the meter can be more accurately arranged, and the manufacture cost and maintenance cost, as well as usefulness of the meter, are all improved upon.

Still another advantage of the meter of this invention is the arrangement of the movable indicator and the matching scale such that one can observe the rate of flow shown on the scale such that the observation can be made on any side of the meter itself in that the scale can be rotated to any position for convenient reading. In accomplishing this objective, the movable or rotatable scale is located on the protective guard which is still retained in substantially air-tight or at least dust-proof condition relative to the indicator and to the portion of the meter over which the indicator is moving.

Still further, the meter of this invention utilizes a simple piston ring and a separate magnet, in addition to the piston, and these parts can be most economically and conveniently provided and utilized in that the entire piston need not be magnetized since the separate magnet serves the magnetic function, and the piston ring is the only part which need be in fluid-tight relation with the piston chamber, and a compression spring holds the parts in their assembled position without any further attachment pieces or connections between the parts.

Other objects and advantages will become apparent upon reading the following description in light of the accompanying drawings.

BRIEF DESCRIPTION OF THE DRAWINGS

FIG. 1 is a longitudinal sectional view through a preferred embodiment of this invention.

FIG. 2 is an end elevational view taken from the right-hand end of FIG. 1.

FIG. 3 is an elevational view of one part shown in FIG. 1.

FIG. 4 is a sectional view taken along the line 4—4 of FIG.1.

FIG. 5 is a plan view of the indicator and a portion of the remainder of the meter as shown in FIG. 1.

FIG. 6 is a sectional view of a fragment of the meter shown in FIG. 1, but with the parts in a different position.

DETAILED DESCRIPTION OF THE PREFERRED EMBODIMENT

The drawings show the meter to include a cylindrical body piece 10 having an inlet opening end at 11 and a fluid outlet opening at 12 and an intermediate chamber 13. The end 11 has a cap 14 which is threaded at 16 into the body piece 10, and the cap 14 and the body-piece end 12 present threaded portions, as shown, for connecting in the fluid-flow line through which the rate of flow is to be determined by this meter.

The interior of the body piece 10 has a cylindrical wall 17 which slidably receives a piston 18 carrying a piston ring 19. The ring 19 is fluid tight with the wall 17 and also with the exterior cylindrical wall 21 of the piston 18. Also, the piston 18 has an annular projection 22 which is in sliding contact with the wall 17, and thus, by virtue of the projection 22 and the ring 19, the piston 18 is stable in the fluid chamber 13 and relative to the cylinder wall 17 and therefore will not tip.

The piston 18 has a central opening 23 extending therethrough and flow communicating the inlet 11 with the outlet 12 since the opening or passageway 23 is circular in shape and permits the flow of fluid therethrough. Of course the piston 18 presents a wall 24 which faces the incoming flow of fluid and which forces on the wall 24 to displace the piston 18 from its right end extreme position in FIG. 1 to movement toward the left, such as shown in FIG. 6.

A metering pin 26 is disposed to be positioned within the piston opening 23, and the pin 26 is conically shaped and is supported on the metering pin retainer 27 extending axially in the body piece 10. Thus, one end of the metering pin 26 is shouldered with the retainer 27 at the shoulder 28, and the other end of the pin 26 is secured by a nut 29 threaded onto the pin retainer threaded end 31. Also, the end 31 extends through a threaded opening 32 in the end wall 33 of the cap 14. A nut 34 is on the threaded end 31 to lock the retainer pin 27 in any axially adjusted position relative to the wall 33, and thereby adjust the zero-rate-flow position or the rate flow position of the metering pin 26 relative to the piston opening 23.

The opposite end 36 of the pin retainer 27 is snugly disposed within an opening 37, to be slidably supported on a disc-shaped guide 38 fixedly secured in the body piece 10. The guide 38 is shown in FIG. 3 with its circular center opening 37 and with fluid passage openings 39. Thus, the pin retainer 27 can be axially positioned relative to the body piece 10, by means of the threaded connection of the retainer end 31 in the threaded opening 32. Consequently, the position of the conical metering pin 26 axially of the body piece 10 is also adjustable or positionable, for adjusting the setting of the meter and thereby compensating for manufacturing tolerances, wear or fit of pieces, and the like.

It will also be seen that a compression spring 41 is disposed between the guide 38 and the piston ring 19, and thus the spring 41 serves to hold the assembled parts in position, and it also serves to yieldingly urge the piston 18 to the right and toward its seated position against the end of the cap 14, as seen in FIG. 1. Thus, with fluid entering the meter at the inlet end 11, and being affective on the piston face 24, the piston 18 is urged to the left, to perhaps the position shown in FIG. 6. Such displacement of the piston 18 permits more flow through the piston opening 23, by virtue of the conically shaped metering pin 26. In this manner, the exact amount of flow through the meter is in proportion to the axial position of the piston 18 relative to the metering pin 26.

To detect the axial position described, a cylindrical magnet 42 encircles a portion of the piston 18 and moves therewith in a snug and fixed manner since the ring 19 holds the magnet 42 against the piston projection 22. A magnetically responsive follower or indicator 43 is cylindrically shaped and is disposed to encircle the body portion 10 and slide thereover and is mainly spaced from the body portion 10 but is also shown to have spaced apart circular end portions 45, identified in FIG. 6, in contact with the circular exterior wall 44 of the body portion 10. Thus, the body portion 10 is of a non-magnetic material, and, by virtue of the magnet 42, the indicator 43 is axially positioned in exact accordance with the position of the piston 18, and the indicator portions 45 provide a freely sliding but non-tipping arrangement of the indicator 43.

A cylindrically shaped guard 46 is disposed over a portion of the body piece 10, and that portion is disposed along the external cylindrical wall 44. The guard 46 is of a transparent material, such as an Acrylic tubing, and it is snugly disposed on the body piece 10 with intervening O-rings 47 which at least dust-guard the indicator 43 and the surface 44. A cylindrical spacer 48 extends over an end of the body piece 10 to actually provide the position and support for one of the O-rings 47 and to pilot the cylindrical guard 46 thereon.

FIG. 5 shows a scale 49 which is preferably disposed on the interior surface, such as at 54 in FIG. 1, of the transparent guard 46, and the scale 49 would have markings and numbers, as shown in FIG. 5, for indicating the rate of fluid flow through the meter. That is, the indicator 43 has an indicator mark, such as the groove or line 51 extending completely therearound, and this mark 51 would be in alignment with the scale 49 for reading the magnitude of fluid flow through the meter, and, as shown in FIG. 5, the scale 49 is itself transparent so that the indicator line 51 can be seen. The cylindrical piece 46 is snug relative to the O-rings 47 and their supporting pieces, but the piece 46 is rotatable so that the scale 49 can be rotated to any position around the meter, and thus the meter can be read from any side of the meter. That is, the scale 49 is affixed to the tubing 46 and is rotatable therewith, and the indicator line 51 extends completely around the cylindrical indicator 43 so that the scale can be positioned to be read in any position which is convenient or desired.

In this arrangement, the meter is basically cylindrically shaped and is therefore conveniently inserted into a fluid line, and the piston itself need not be magnetized, and the magnet 42 need not be accurately manufactured in its diametrical relationship and it is nevertheless secured with the piston by virtue of the spring 41 urging the magnet 42 into fixed position with the piston 18. Still further, the magnet 42 is magnetized parallel to its length and can be so arranged separate from the manufacture of the piston 18 and piston ring 19 where fluid tightness is required. Also, by virtue of the threaded arrangement between the pin retainer end 31 and the end cap wall 33, the adjustment of the meter is readily accomplished without disassembling the meter, and only a screw slot or Allen head wrench opening 52, as seen in FIG. 2, is required for axially adjusting the position of the pin retainer 27, and the lock nut 34 is also accessible from the exterior of the meter without requiring disassembly for any adjustment thereof. Of course the indicator 43 is of a magnetically attractive material and it will therefore move in complete response to the axial movement of the magnet 42 and thereby give a completely accurate reading as to the rate of flow through the meter, which rate of flow is in accordance with the axial displacement of the piston 18 for opening or reducing the annulus of the opening or reducing the annulus of the opening 23 defined by the position of the opening 23 along the axis of the conical piece 26. Also, the piece 26 has a cylindrical end portion 53 which mates with the cylindrical opening 23 when there is no flow through the meter. Also, the tubular piece 46 is described as being of a planar form which is meant to include either a flat or a circular or cylindrical shape but which is sheet-like having a length and width but minimum thickness, as with the wall of the tubular piece 46. Then the scale 49 is positioned immediately adjacent the indicator line 51, and only a minimum of parallax results in the reading of the rate of flow on the scale 49. In this arrangement, the tubular piece 46 is axially fixed relative to the body 10 by being shouldered therewith at opposite ends of the piece 46 in the manner shown in FIG. 1 and as will be apparent to any one skilled in the art, so that the scale 49 is in a fixed position, except for the rotation around the meter, as described.

What is claimed is:

1. A fluid-flow meter for indicating the rate of flow of a fluid moving therethrough, comprising a body-piece of a non-magnetic material and being tubularly shaped and having a fluid inlet opening and a fluid outlet opening and a tubularly shaped chamber disposed intermediate said openings, a piston slidably disposed within said chamber and having an opening therein for the flow of fluid therethrough, a spring operatively associated with said piston for yieldingly urging said piston in one axial direction and with said direction being opposite to the direction of flow of fluid, a conically shaped piece supported in said body and disposed in said piston opening for movement of said piston axially of said conically shaped piece and therealong, a magnet disposed in said body piece and being operatively associated with said piston for axial movement therewith, a tubular piece of transparent material supported on said body piece and extending therealong radially spaced from said body piece and with the opposite ends of said tubular piece being in endless contact with said body piece for dust-sealing with said body piece, a cylindrically shaped indicator slidably disposed on the exterior of said body piece and being disposed in the space between said body piece and said tubular piece and being of a magnetically attractive material and axially movable with the axial movement of said magnet and having an indicator line thereon, and a numerical scale on said tubular piece adjacent said indicator for matching with said indicator line to show the axial position of said indicator, and thereby that of said magnet and said piston, in response to the flow of fluid through said piston opening.

2. The fluid flow meter as claimed in claim 1, wherein said tubular piece is cylindrically shaped and is rotatable on said body piece for positioning said scale to selected positions around said body piece.

3. The fluid flow meter as claimed in claim 2, wherein said scale is disposed on the inside surface of said tubular piece and is disposed immediately adjacent said indicator line, for protecting said scale from damage and for reducing parallax in the reading of said scale relative to said indicator line.

4. The fluid flow meter as claimed in claim 1, wherein said piston includes an annular projection at one axial end thereof and with said projection being in fluid-tight sliding contact with said body piece, said magnet being cylindrically shaped and telescopically disposed over said piston with one end of said magnet being in abutment with said projection and with said magnet being of a length shorter than that of said piston to have the other end of said magnet disposed short of the end of said piston opposite said projection, a ring disposed on said piston and disposed in abutment with the other end of said magnet, and said spring being in abutment with said ring for securing said ring and said magnet axially set on said piston.

5. The fluid flow meter as claimed in claim 1, wherein the axially opposite ends of said indicator are radially inwardly disposed relative to the remainder of said indicator and are the only portions of said indicator in sliding contact with said body piece, for stability of said indicator on said body piece.

6. The fluid-flow meter as claimed in claim 1, including adjustment means associated with said conically-shaped piece for adjustably positioning said conically shaped piece axially of said piston opening for adjusting the zero-flow position of said conically shaped piece relative to the plane on which said piston opening is disposed.

7. The fluid-flow meter as claimed in claim 6, wherein said adjustment means is a threaded piece threadedly anchored with said body piece.

8. The fluid-flow meter as claimed in claim 1, including cylindrical portions extending at each axial end of said conically shaped piece, and one of said cylindrical portions being threaded and adjustably anchored relative to said body piece for axially positioning said conically shaped piece relative to said body piece and thereby adjust the zero setting of said meter, and a circular guide slidably receiving the other of said cylindrical portions for movably supporting said conically-shaped piece.

9. The fluid-flow meter as claimed in claim 1, wherein said indicator line extends circularly around said indicator, and said scale being on the interior of said tubular piece and being on a transparent piece for viewing said indicator line therethrough.

* * * * *

REEXAMINATION CERTIFICATE (2086th)
United States Patent [19]

Hedland

[11] B1 3,805,611
[45] Certificate Issued    Sep. 14, 1993

[54] FLUID FLOW METER

[75] Inventor: Harry A. Hedland, Racine, Wis.

[73] Assignee: Racine Federated, Inc., Racine, Wis.

Reexamination Request:
No. 90/002,374, Jun. 24, 1991

Reexamination Certificate for:
Patent No.: 3,805,611
Issued: Apr. 23, 1974
Appl. No.: 313,784
Filed: Dec. 11, 1972

[51] Int. Cl.⁵ .............................................. G01F 1/20
[52] U.S. Cl. ............................................... 73/861.58
[58] Field of Search ................. 73/196, 199, 321, 325, 73/861.53, 861.54, 861.56, 861.57, 861.58

[56] References Cited

U.S. PATENT DOCUMENTS

| | | | |
|---|---|---|---|
| 955,175 | 4/1910 | Lomax | 73/325 |
| 2,325,884 | 8/1943 | Schorn | 73/861.58 |
| 2,370,634 | 3/1945 | Brewer | 73/861.53 |
| 2,439,614 | 4/1948 | Schramm | 73/196 |
| 2,531,774 | 11/1950 | Guthmann | 73/321 |
| 2,638,582 | 5/1953 | Urso et al. | 116/238 |
| 2,655,041 | 10/1953 | Jacobsson | 73/199 |
| 3,218,853 | 11/1965 | Ongaro | 73/861.54 |
| 3,398,305 | 8/1968 | Brewer | 73/861.56 |
| 3,554,031 | 1/1971 | Turner | 73/861.58 |

FOREIGN PATENT DOCUMENTS

| | | |
|---|---|---|
| 1760010 | 11/1957 | Fed. Rep. of Germany . |
| 611476 | 10/1960 | Italy . |
| 252803 | 1/1948 | Switzerland . |
| 504540 | 4/1939 | United Kingdom . |

*Primary Examiner*—Herbert Goldstein

[57]    ABSTRACT

A fluid flow meter including a body piece having a chamber, and a piston slidably disposed within the chamber and having an opening therein for the flow of fluid therethrough. A spring urges the piston in one direction, and fluid pressure urges the piston in the opposite direction. A conically shaped piece is disposed axially of the piston and in the opening therein so that the axial position of the piston is in accordance with the rate of fluid flow through the opening. A magnet is on the piston, and the body piece is of a non-magnetic material, and a follower is on the exterior of the body piece and is attracted by the magnet to move with the displacement of the piston. A transparent guard is disposed over the indicator follower, and a scale is on the guard to show the position of the indicator and thus show the rate of flow through the meter. The conical piece has a threaded connection between it and the body for adjustably positioning the conical piece and thus setting the zero position, and the conical piece is slidably piloted in the body. Also, the transparent guard is cylindrically shaped and can be rotated to various positions for presenting the scale to different sides of the meter and thus permit reading from any selected side.

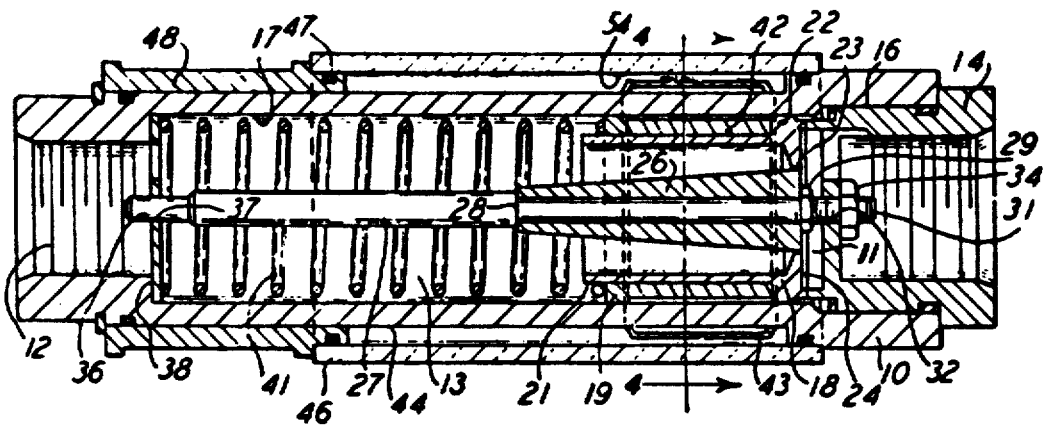

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *